(12) United States Patent
Yamaguchi

(10) Patent No.: US 8,446,626 B2
(45) Date of Patent: May 21, 2013

(54) MONITORING DEVICE, IMAGE FORMING DEVICE, SYSTEM INCLUDING THESE DEVICES CONNECTED AND METHOD FOR MONITORING THE SAME

(75) Inventor: Kotaro Yamaguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 309 days.

(21) Appl. No.: 12/986,606

(22) Filed: Jan. 7, 2011

(65) Prior Publication Data

US 2011/0194143 A1  Aug. 11, 2011

(30) Foreign Application Priority Data

Feb. 9, 2010 (JP) ................. 2010-027000

(51) Int. Cl.
*G06F 15/00* (2006.01)
*G03G 15/16* (2006.01)
(52) U.S. Cl.
USPC .......................................... 358/1.15; 709/224
(58) Field of Classification Search .................. 358/1.15
See application file for complete search history.

(56) References Cited

U.S. PATENT DOCUMENTS

2004/0098480 A1 * 5/2004 Sekizawa ...................... 709/224

FOREIGN PATENT DOCUMENTS

JP  11-313130 A  11/1999

* cited by examiner

*Primary Examiner* — Saeid Ebrahimi Dehkordy
(74) *Attorney, Agent, or Firm* — Fitzpatrick, Cella, Harper & Scinto

(57) ABSTRACT

A monitoring device for an image forming device receives from the image forming device usage information indicating a history of manipulations by a user and reduction information indicating that the image forming device is operating in a reduction mode. When having received reduction information, the monitoring device determines the priority of maintenance work on a function the provision of which has been halted indicated by the reduction information, registers the determined priority in a management table in association, and outputs the registered reduction information and associated priority. When the received usage information indicates a manipulation with respect to a function the provision of which has been halted indicated by the received reduction information, the priority corresponding to the reduction information is determined to be relatively higher than when there is no manipulation with respect to the function the provision of which has been halted indicated by the received reduction information.

12 Claims, 17 Drawing Sheets

F I G. 1
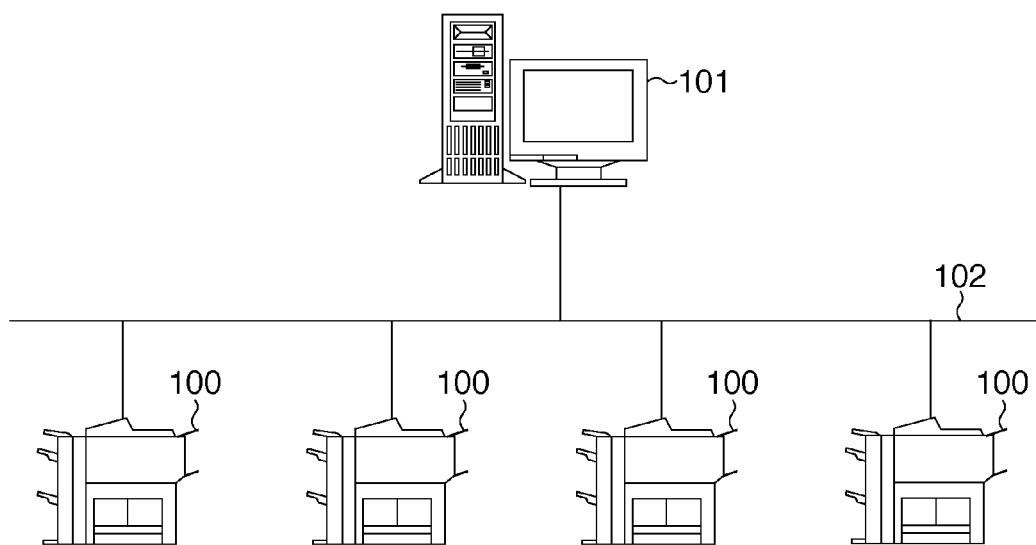

FIG. 8

800 — USAGE TRACE TYPE / REDUCTION FUNCTION TYPE table

| REDUCTION TYPE (801) | REDUCTION FUNCTION TYPE (802) | | | | | | | | | USAGE TRACE TYPE (803) | |
|---|---|---|---|---|---|---|---|---|---|---|---|
| | ADF SCAN | MANUAL SCAN | FAX SEND | SCAN SEND | BOX SEND | FAX RECEIVE | NETWORK RECEIVE | COPY | FAX PRINT | NETWORK PRINT | BOX PRINT | USAGE TRACE TYPE OF REDUCTION FUNCTION | USAGE TRACE TYPE OF ALTERNATIVE FUNCTION |
| ADF REDUCTION (804) | ● | | | | | | | | | | | ADF DOCUMENT PLACEMENT | MANUAL SCAN |
| SCANNER REDUCTION (805) | ● | ● | ● | ● | | | | ● | | | | ADF DOCUMENT PLACEMENT, PRESSING PLATE OPENING AND CLOSING | — |
| FAX REDUCTION (806) | | | ● | | | ● | | | | | | — | SCAN SEND BOX SEND |
| PRINTER REDUCTION (807) | | | | | | | | ● | ● | ● | ● | NETWORK PRINT JOB RECEPTION FAX PRINT JOB RECEPTION | — |

FIG. 9

| REDUCTION TYPE | REDUCTION FLAG |
|---|---|
| ADF REDUCTION | 1 |
| SCANNER REDUCTION | 0 |
| FAX REDUCTION | 0 |
| PRINTER REDUCTION | 0 |

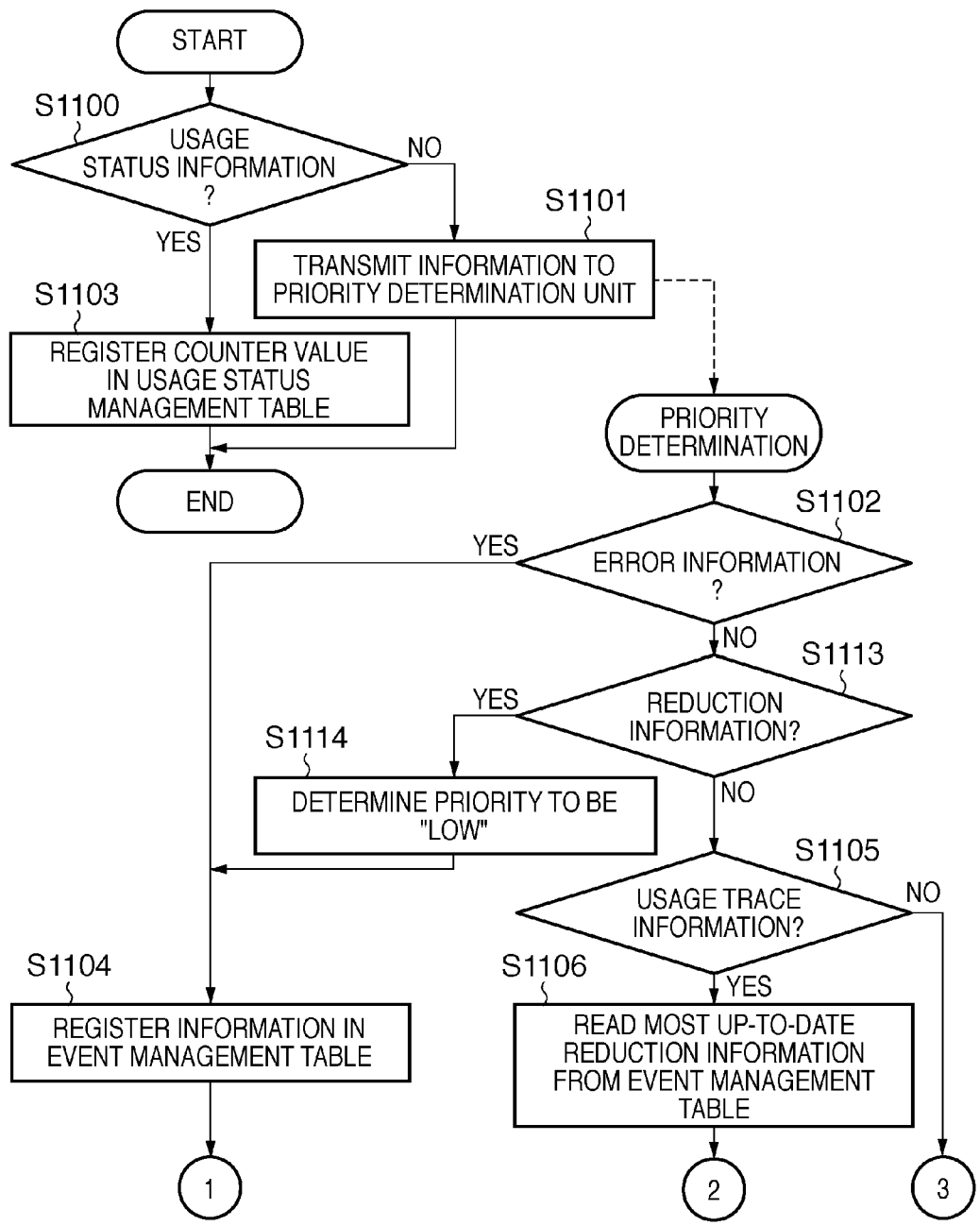
F I G. 11A

FIG. 12

| FUNCTION TO BE SUBJECTED TO REDUCTION | COUNTER VALUE |
|---|---|
| ADF SCAN | 20305 |
| MANUAL SCAN | 5284 |
| FAX SEND | 204 |
| SCAN SEND | 3951 |
| BOX SEND | 0 |
| FAX RECEIVE | 481 |
| NETWORK RECEIVE | 49 |
| COPY | 25589 |
| FAX PRINT | 481 |
| NETWORK PRINT | 15839 |
| BOX PRINT | 1003 |

FIG. 13

| MODEL NUMBER (1301) | DATE AND TIME OF OCCURRENCE (1302) | EVENT TYPE (1303) | EVENT CONTENT (1304) | CORRESPONDENCE PRIORITY (1305) |
|---|---|---|---|---|
| ABCD459201 | 2009. 3. 11. 15:42 | ADF REDUCTION | DOCUMENT FEEDING MOTOR ABNORMALITY | HIGH |
| EEFP509482 | 2009. 3. 11. 13:04 | ERROR | POWER UNIT COOLING FAN ABNORMALITY | - |
| YEPS138502 | 2009. 3. 11. 11:49 | FAX REDUCTION | FAX BOARD TRANSMISSION ABNORMALITY | MIDDLE |
| UPCM580398 | 2009. 3. 10. 18:49 | ERROR | MOTOR FAULT | - |
| VISM248534 | 2009. 3. 10. 17:03 | ERROR | HDD I/O ERROR | - |
| WURS459139 | 2009. 3. 10. 13:09 | PRINTER REDUCTION | PRINTER TRANSMISSION ERROR | MIDDLE |
| ABCD459201 | 2009. 3. 10. 10:41 | ERROR | POWER UNIT COOLING FAN ABNORMALITY | - |
| SWKM203471 | 2009. 3. 09. 8:39 | PRINTER REDUCTION | BEING OUT OF TONNER | LOW |
| UPCM580398 | 2009. 3. 09. 20:31 | SCANNER REDUCTION | SCANNER LAMP BURNOUT | HIGH |
| ... | ... | ... | ... | ... |

FAULT INFORMATION SCREEN 1400

| 1401 DATE AND TIME OF OCCURENCE | 1402 MODEL NUMBER | 1403 TYPE | 1404 NATURE | 1405 CORRESPONDENCE PRIORITY |
|---|---|---|---|---|
| 2009.12.11. 15:42 | ABCD459201 | ADF REDUCTION | DOCUMENT FEEDING MOTOR ABNORMALITY | HIGH |
| 2009.12.11. 14:04 | EEFP509482 | ERROR | POWER UNIT COOLING FAN ABNORMALITY | – |
| 2009.12.11. 11:49 | YEPS148502 | FAX REDUCTION | FAX BOARD TRANSMISSION ABNORMALITY | MIDDLE |
| 2009.12.10. 18:49 | UPCM580398 | ERROR | MOTOR FAULT | – |
| 2009.12.10. 17:03 | VISM248534 | ERROR | HDD I/O ERROR | – |
| 2009.12.10. 14:09 | WURS459149 | PRINTER REDUCTION | PRINTER TRANSMISSION ERROR | MIDDLE |
| 2009.12.10. 10:41 | ABCD459201 | ERROR | POWER UNIT COOLING FAN ABNORMALITY | – |
| 2009.12.10. 8:39 | SWKM203471 | PRINTER REDUCTION | BEING OUT OF TONER | LOW |
| 2009.12.09. 20:31 | UPCM580398 | SCANNER REDUCTION | SCANNER LAMP BURNOUT | HIGH |
| ... | ... | ... | ... | ... |

MONITORING DEVICE, IMAGE FORMING DEVICE, SYSTEM INCLUDING THESE DEVICES CONNECTED AND METHOD FOR MONITORING THE SAME

BACKGROUND OF THE INVENTION

1. Field of the Invention

The present invention relates to a technique for monitoring image forming devices.

2. Description of the Related Art

To maintain image forming devices such as copiers and printers, systems that monitor the occurrence of operational faults at the image forming devices at all times have been heretofore devised. In these systems, information about operational faults that have occurred is transmitted to maintenance workers through a screen display or the like to urge the execution of maintenance work on the devices. In the case where operational faults have occurred at plural image forming devices at the same time, the maintenance worker usually executes maintenance work in order of priority predetermined according to the order in which the operational faults have occurred or the natures of the faults. And further, Japanese Patent Laid-Open No. 11-313130, for example, has proposed a method of determining the contribution levels of image forming devices by assigning weights to the number of users of each image forming device, the degree of the importance for each user, and the degree of the importance for each provided function, and, the priority of maintenance work is determined by the contribution levels. In this method, the order of the maintenance work can be set based on the usage statuses of image forming devices before the occurrence of operational faults.

On the other hand, some recent-model image forming devices have a mechanism in which when some functions tend not to work well, the provisions of those function are halted and the other functions can be used continuously. The above mechanism, that is, an operation in which the provision of a particular function(s) is halted and the other functions are provided at image forming devices is referred to as reduction operation. Maintenance workers have to keep functions the provisions of which are halted ready to work so that the functions can be provided even at image forming devices in reduction operation as usual.

Each maintenance worker usually maintains many image forming devices. In that case, there is a possibility that the image forming devices in which the provisions of all functions are halted due to faults and the image forming devices in reduction operation are to be subjected to maintenance work at the same time. In the foregoing related art, however, it is assumed that image forming devices in reduction operation are not subjected to maintenance work, and thus the appropriate priority of the maintenance work cannot be determined.

SUMMARY OF THE INVENTION

The present invention has been accomplished in consideration of the foregoing related art. Thus, the present invention provides a method for determining an appropriate priority of maintenance work at a system including image forming devices capable of performing reduction operation.

The present invention has the following features. That is, a monitoring device for monitoring an image forming device by being connected with the image forming device capable of operating in a reduction mode in which provision of a function is halted, comprises:

a receiver configured to receive from the image forming device usage information indicating a history of manipulations by a user and reduction information indicating that the image forming device is operating in a reduction mode;

a priority determination unit configured, when having received the reduction information with the receiver, to determine a priority of maintenance work on a function the provision of which has been halted as indicated by the reduction information;

a registration unit configured to register in a management table the reduction information received by the receiver and the priority determined by the priority determination unit based on the reduction information in association with each other; and an output unit configured to output the reduction information and the associated priority information registered in the management table by the registration unit, wherein when the usage information received by the receiver indicates a manipulation with respect to a function the provision of which has been halted indicated by the received reduction information, the priority determination unit determines a priority corresponding to the reduction information so that the priority is relatively higher than in the case where there is no manipulation with respect to the function the provision of which has been halted.

According to another aspect, the present invention has the following features:

An image forming device connected with the above monitoring device and capable of operating in a reduction mode in which provision of a function is halted, comprises:

a unit configured, when the image forming device operates in the reduction mode, to transmit to the monitoring device reduction information indicating the operation in the reduction mode;

a detector configured to detect a manipulation by a user; and a unit configured to transmit information about the manipulation detected by the detector to the monitoring device as usage information.

According to still another aspect of the present invention, a system, wherein a plurality of image forming devices capable of halting provision of a function in a reduction mode are connected with a monitoring device that monitors the image forming devices, the system comprises:

a priority determination unit configured, by using usage information indicating a history of manipulations by a user at an image forming device and reduction information indicating that the image forming device is operating in a reduction mode, to determine a priority of maintenance work on a function the provision of which has been halted indicated by the reduction information;

a registration unit configured to register in a management table the reduction information and the priority determined by the priority determination unit based on the reduction information in association with each other; and an output unit configured to output the reduction information and the associated priority information registered in the management table by the registration unit, wherein when the usage information indicates a manipulation with respect to a function the provision of which has been halted indicated by the reduction information, the priority determination unit determines a priority corresponding to the reduction information so that the priority is relatively higher than in the case where there is no manipulation with respect to the function the provision of which has been halted.

In a system including image forming devices capable of performing reduction operation, the present invention makes it possible to appropriately determine the priority of maintenance work on the devices according to the status of the use of the devices by the user before the maintenance work. As a result, the maintenance work based on the priority can be executed on the devices, and thus a higher level of user satisfaction can be attained.

Further features of the present invention will become apparent from the following description of exemplary embodiments with reference to the attached drawings.

BRIEF DESCRIPTION OF THE DRAWINGS

FIG. 1 is an illustration showing the configuration of a whole system according to the present invention.

FIG. 8 is a list referred to as a reduction definition table 800.

FIG. 9 is a list referred to as a reduction management table 900.

FIGS. 11A and 11B show flowcharts illustrating processing performed by the monitoring device 101.

FIG. 12 is a list referred to as a usage status management table 1200.

FIG. 13 is a list referred to as an event management table 1300.

FIG. 14 is an illustration showing an example of a display on a fault information screen 1400.

DESCRIPTION OF THE EMBODIMENTS

First Embodiment
<System Configuration>

A first embodiment where the present invention is implemented will be described below with reference to the drawings. FIG. 1 is an illustration of a whole system according to embodiments of the invention. In FIG. 1, image forming devices 100 are specifically multifunction copiers having not only a copy function but also a network printing function, a facsimile function, and so on. In this figure, the plurality of image forming devices 100 and a monitoring device 101 that monitors the operating states of the image forming devices are connected to a network 102 (hereinafter referred to as "LAN"). The image forming devices 100 each perform operations such as printing out image data received via the LAN 102 and communicating the state to the monitoring device 101. Note that a system configuration may be used in which the monitoring device 101 is provided on an external network via the Internet and in which each image forming device 100 and the monitoring device 101 are connected with each other via the Internet.

<Hardware Configuration of Control Sections of Image Forming Devices>

Figure 2:
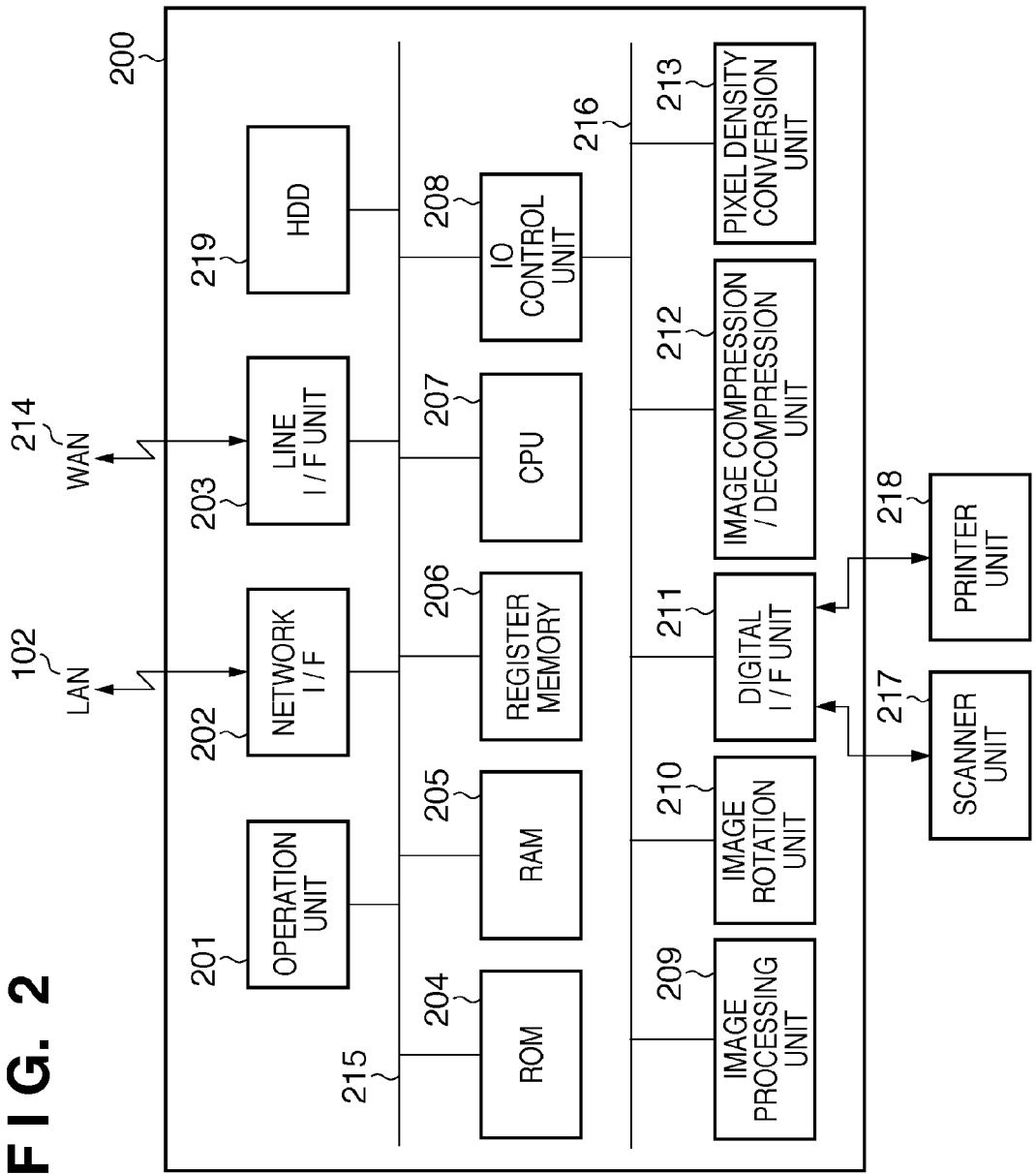
FIG. 2 is a block diagram illustrating the hardware configuration of a controller 200 in an image forming device 100.

FIG. 2 is a block diagram illustrating the hardware configuration of a controller 200 that is provided in each image forming device 100 and controls the whole device 100. The components of the controller 200 are connected to a system bus 215 and an image bus 216. A CPU 207 controls the whole image forming device 100. The CPU 207 runs an OS, application programs, and so on loaded in a HDD 219 to perform overall processing as the image forming device 100. All things described as processing performed by the image forming devices 100 in this embodiment are things done under the control of the CPU 207.

A ROM 204 is loaded with programs such as a basic I/O program and so on. At the time of the start-up of the controller 200, the CPU 207 reads the basic I/O program from the ROM 204, and runs the program. A RAM 205 is not only a work memory area for running programs but an image memory for temporarily storing image data. A register memory 206 is a nonvolatile memory that stores information necessary to be further held after a restart of the image forming device 100. Such information refers to settings of various operation modes, the contents of an address book, counter values, device IDs for identifying the individual image forming devices 100, the trade names of the devices 100, and so on. An HDD 219 is a hard disk drive on which reams of image data handled within the image forming device 100 are accumulated and information on faults, such as errors, jams, and alarms, and a control program for the image forming device 100 are stored. A network I/F 202 is an interface unit for connection to the LAN 102, which communicates with external apparatus, such as personal computers (PCs) and the monitoring device 101, via the LAN 102. A line I/F unit 203 is connected to an ISDN or a public telephone network (hereinafter referred to as "WAN 214") to transmit and receive data to and from remote terminals under the control based on a communication control program loaded in the ROM 204. Facsimile transmission and reception are also made using the line I/F unit 203. In an operation unit 201, a display unit and a key-in unit are provided, which are controlled by the CPU 207. The operator issues instructions as to various settings on scanner reading and printouts and instructions as to the activation and halt thereof via the key-in unit. The operator further issues instructions for displaying the information stored in the register memory 206 and the HDD 219 at the operation unit 201. On the system bus 215, the components described above are placed.

An IO control unit 208 is a bus bridge for connecting the system bus 215 and the image bus 216 on which image data are transferred at high speed. On the image bus 216, the following functional units are placed. A digital I/F unit 211 connects the scanner unit 217 and the printer unit 218 of the image forming device 100 with the controller 200 to convert between synchronous and asynchronous image data. And further, information detected by the foregoing various sensors placed at spots in the scanner unit 217 and the printer unit 218 flows to the system bus 215 via the digital I/F unit 211 and the IO control unit 208. An image processing unit 209 corrects, processes, and edits input and output image data. An image rotation unit 210 rotates images. An image compression/decompression unit 212 subjects multivalued image data to compression/decompression processing based on JPEG, and subjects binary image data to compression/decompression processing based on JBIG/MMR/MR/MH. An image density conversion unit 213 subjects image data to be outputted to resolution conversion and so on.

In addition to the control unit are provided the scanner unit, the printer unit, and a communication unit (which makes facsimile and data transmission and reception), which are controlled by the control unit. And further, the use of each image forming device is made from an operation panel (not shown), and can be further made through a computer or the like communicably connected thereto. From the computer, remote printing, remote scanning, facsimile transmission, box transmission and reception described below, and so on can be done. The image forming devices further have a so-called box function, that is, the function of storing document data received from the network or the like or scanned in a storage medium (box) such as the hard disk or the like. It is possible to transmit and receive facsimiles by the use of the box function and, in addition, the scanner unit and the printer unit, and to transmit or print out document data from the box. These transmissions from and receptions at the box are referred to as box transmissions and receptions. The scanner is provided with a platen on which documents are placed, and can perform manual scanning wherein documents fixed on the platen by the use of a document pressing plate are consecutively scanned by a moving optical system, or can perform ADF scanning wherein documents are consecutively fed from an automatic document feeder (ADF), and scanned by a fixed optical system. The ADF is provided with a document sensor and also a pressing plate opening/closing sensor that detects the opening and closing of the pressing plate. When the placement of documents or the opening/closing of the pressing plate has been detected by these sensors, the result of the detection is reported to the monitoring device as usage trace information described later.

<Reduction Operation>

The image forming devices can perform "reduction operation." Reduction refers to the function of, for example, when there are a function involving the occurrence of a fault and a function involving the assumption that a fault tends to occur, preventing those functions from being operated, that is, of halting the provisions of those functions; reduction operation is performed based on a manipulation done by an operation manager etc., regardless of whether some fault occurs or not. And further, in this embodiment, the reduction operation is automatically started in an image forming device, in response to occurrence of fault of an function, when another function can be used in the image forming device. Incidentally, a state of performing reduction operation (operation mode) is also referred to as "reduction mode." On the other hand, an operation mode in which all functions provided can be used is referred to as "normal mode"; returning to the normal mode by eliminating a fault that has resulted in reduction operation is referred to as the termination of reduction.

<Hardware Configuration of Monitoring Device>

Figure 3:
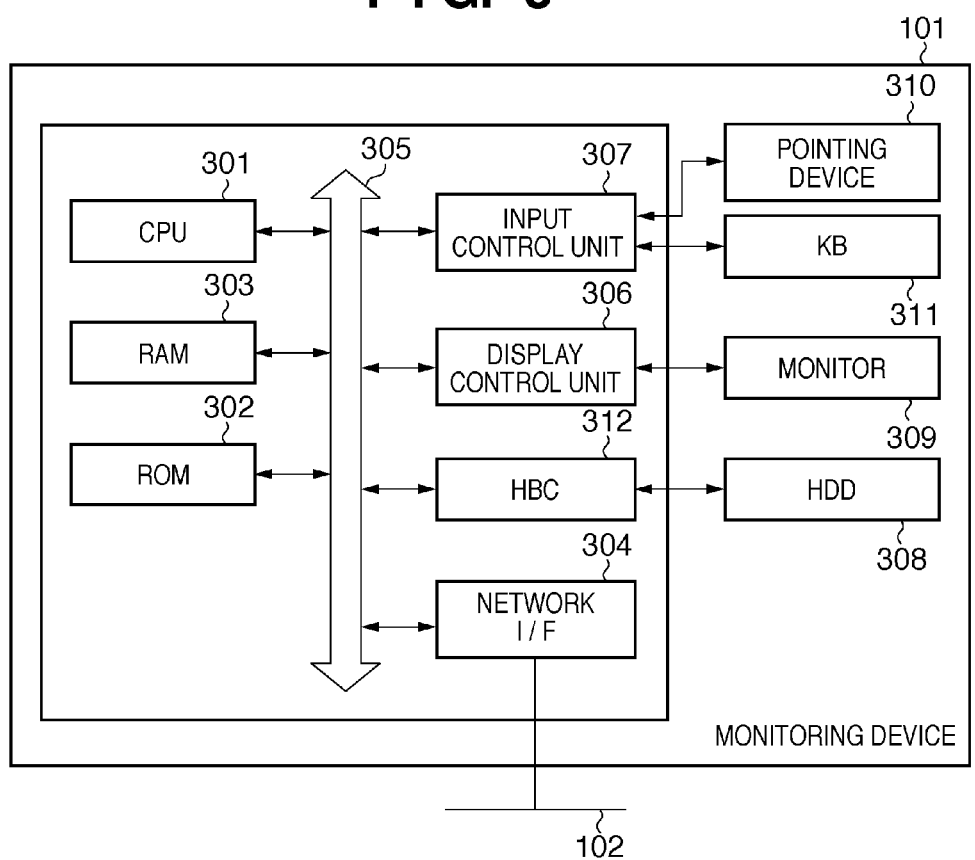
FIG. 3 is a block diagram illustrating the hardware configuration of a monitoring device 101.

FIG. 3 is a block diagram illustrating a hardware configuration of the monitoring device 101. A CPU 301 controls the whole monitoring device 101. The CPU 301 runs the OS, application programs, and so on loaded in a HDD 308 connected to a bus 305 via a hard disk controller 312 to perform overall processing as the monitoring device 101. The monitoring device 101 can be implemented by, for example, making a general-purpose computer run a program for providing a monitoring device function. That is, all things described as processing performed by the image forming devices 100 in this embodiment are things done under the control of the CPU 301.

A ROM 302 is loaded with programs such as a basic I/O program and so on. At the time of the start-up of the monitoring device 101, the CPU 301 reads the basic I/O program from the ROM 302 to run the program. A RAM 303 is a work memory area for running a program. A network I/F unit 304 is a network I/F unit for communicating with the image forming devices 100 via the LAN 102. A display control unit 306 is connected to a monitor 309 to control screen display at a monitor 309. An input control unit 307 is connected to a pointing device 310 and a keyboard 311 to control input from both the components 310 and 311. The monitoring device 101 has a configuration in which such hardware is placed on the system bus 305.

<Notifications from Image Forming Devices to Monitoring Device>

Figure 4:
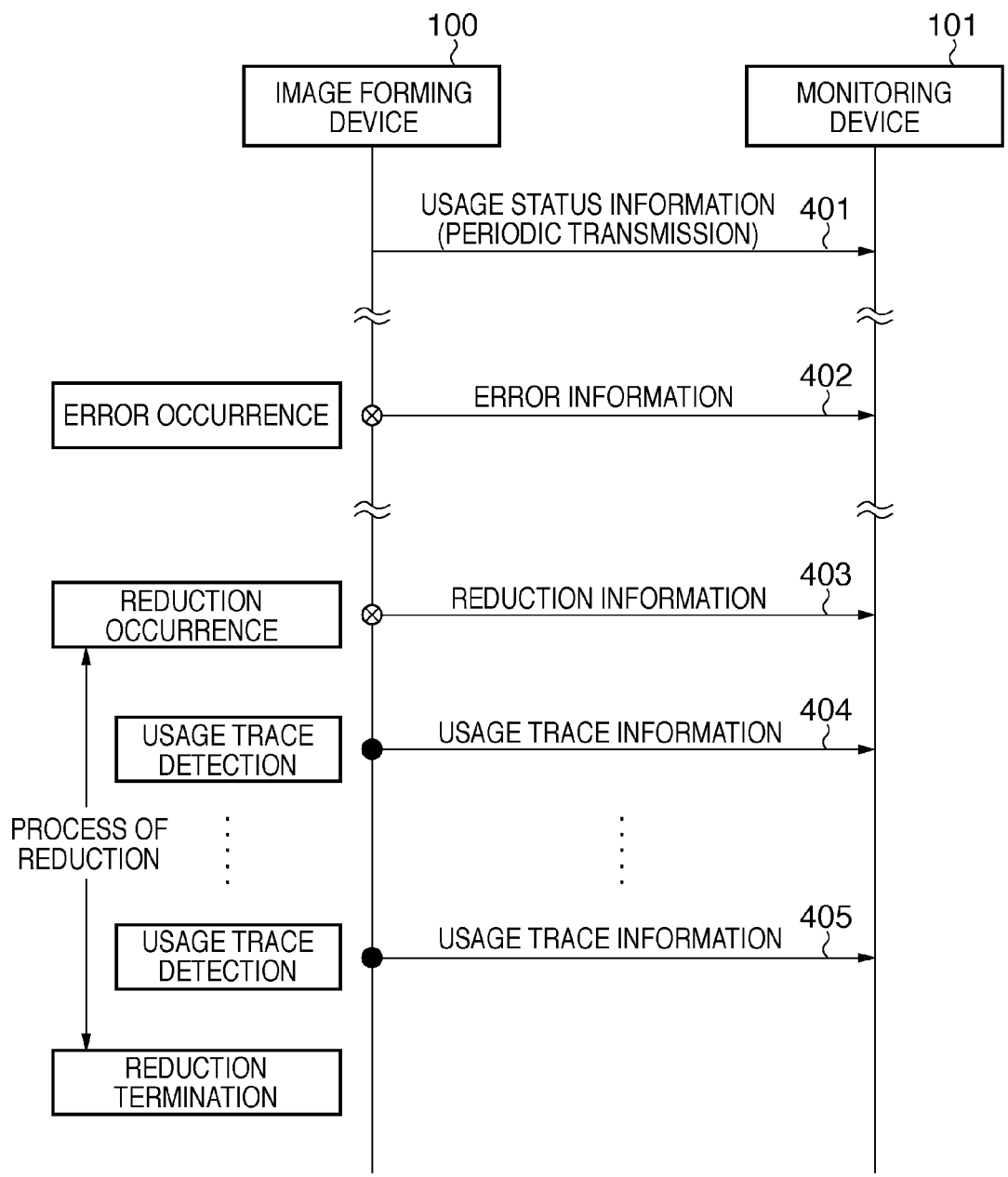
FIG. 4 is an illustration showing a sequence of transmissions of information from the image forming devices 100 to the monitoring device 101.

FIG. 4 is a sequence diagram of transmissions from the image forming devices 100 to the monitoring device 101. All the transmissions shown in this diagram are made via the network I/F 202 or the line I/F unit 203 of each image forming device 100.

The image forming devices 100 constantly ascertains the use quantity of various functions by a user as usage status information in the form of counting, for example, the number of sheets used on a function-by-function basis. Such various functions specifically refer to the following:

an ADF scan function (automatic document feeding scan function)—the function of scanning documents by using the automatic document feeder (hereinafter referred to as "ADF") in the scanner unit 217, a manual scan function—the function of scanning documents placed on a platen glass in the scanner unit 217 instead of using the ADF, a fax sending function—the function of transmitting information obtained by scanning documents with the scanner unit 217 via facsimile (fax), a scan sending function—the function of transmitting information obtained by scanning documents with the scanner unit 217 via the LAN 102 to the outside of the device 100 via e-mail or FTP, a box sending function—the function of transmitting image data accumulated in the HDD 219 via the LAN 102 to the outside of the device 100 via e-mail or FTP, a fax receiving function—the function of accumulating image data received via facsimile (fax) in the HDD 219, a network receiving function—the function of accumulating image data received from the outside of the device 100 via the LAN 102 in the HDD 219, a copy function (reproduction function)—the function of directly printing out with the printer unit 218 results obtained by scanning documents with the scanner unit 217, a fax printing function—the function of directly printing out image data received via fax with the printer unit 218, a network printing function—the function of directly printing out data received from the outside of the device via the LAN 102 with the printer unit 218, and a box printing function—the function of directly printing out image data accumulated in the HDD 219 with the printer unit 218.

Incidentally, in this embodiment, a combination of the scan sending function and the box sending function is referred to as data transmission.

Referring back to FIG. 4, the image forming devices 100 periodically transmit usage status information 401 to the monitoring device 101 according to a predetermined communication schedule setting. Each image forming device 100 previously holds ID for uniquely identifying the device itself (for example, its model number) in the register memory 206. At the time of transmission of usage status information, each image forming device 100 also notifies the monitoring device 101 of its model number concurrently.

Moreover, when an operation error has arisen within itself, each image forming device 100 notifies the monitoring device 101 of its model number, the date and time of the error, and the nature of the error as error information 402.

Furthermore, when reduction operation is performed due to an operation error that has occurred within itself, a particular manipulation, or the like, each image forming device 100 notifies the monitoring device 101 of its model number, the date and time of the reduction, and the nature of the reduction as reduction information 403.

As concrete examples of reduction operation performed at the image forming devices 100, there are four modes—ADF reduction, scanner reduction, fax reduction, and printer reduction. ADF reduction refers to a mode in which the provision of the ADF scan function or combined functions including the ADF scan function is halted. Scanner reduction refers to a mode in which the provision of the scan function of the scanner unit 217 or combined functions including the scan function is halted. Fax reduction refers to a mode in which the provision of the fax transmission function via the line I/F unit 203 or combined functions including the fax transmission function is halted. Printer reduction refers to a mode in which the provision of the printing function at the printer unit 218 or combined functions including the printing function is halted.

Next, transmission of usage trace information 404 shown in the sequence diagram of FIG. 4 will be described below. When the user has used one or more of the functions of the image forming device 100 or performed some manipulations, the image forming device 100 brings out the details of the particular function(s) of them or of the particular manipulation(s) of them as a usage trace, and furnishes the details as usage trace information. The transmission of the usage trace information is made only during reduction operation.

Then, the concrete contents of usage trace information will be described in detail below with reference to FIG. 8. FIG. 8 is a table illustrating the relationship between the foregoing four reduction operation types, functions the use of which is halted at the time of the individual reduction operations, that is, functions the provisions of which are halted, and usage trace information transmitted during the individual reduction operations at the image forming devices 100. FIG. 8 in which these information items are shown is referred to as a reduction definition table 800.

The image forming devices 100 and the monitoring device 101 hold the reduction definition table 800 data in their HDDs. The items marked with a bullet "•" in the column of reduction function types 802 of the reduction definition table 800 represent functions the use of which is to be halted at the individual reduction operations. Specifically, in the ADF reduction, only the ADF scan function involving the use of the ADF is a function the use of which is to be halted. In the scanner reduction, the ADF scan function, the manual scan function, the fax sending function, the scan sending function, and the copy function, each involving scanning at the scanner unit 217, are functions the use of which is to be halted. In the fax reduction, the fax sending function and the fax receiving function as a fax sending/receiving function are functions the use of which is to be halted. In the printer reduction, the copy function, the fax printing function, the network printing function, and the box printing function each involving printouts at the printer unit 218 are functions the use of which is to be halted.

Moreover, the usage trace information refers to information about a trace(s) born when the user has performed a manipulation(s) concerned with the function(s) the use of which was halted at the time of each reduction operation or about a result brought about when the user has used the alternative function(s) to the function(s) the use of which was halted. The information in the "usage trace type" column 803 of the reduction definition table 800 corresponds to the above information. Specifically, in the ADF reduction, a result of detecting the placement of documents on the ADF by the sensors of the ADF or a result of using the manual scan function corresponds to the usage trace information. In the scanner reduction, a result of detecting the placement of documents on the ADF by the sensors of the ADF or a result of opening and closing the plank corresponds to the usage trace information. In the fax reduction, a result of using the scan sending function or the box sending function corresponds to the usage trace information. In the printer reduction, a result of receiving network printing job information or fax printing job information from an external apparatus corresponds to the usage trace information.

<Functional Blocks in Image Forming Devices>

Figure 5:
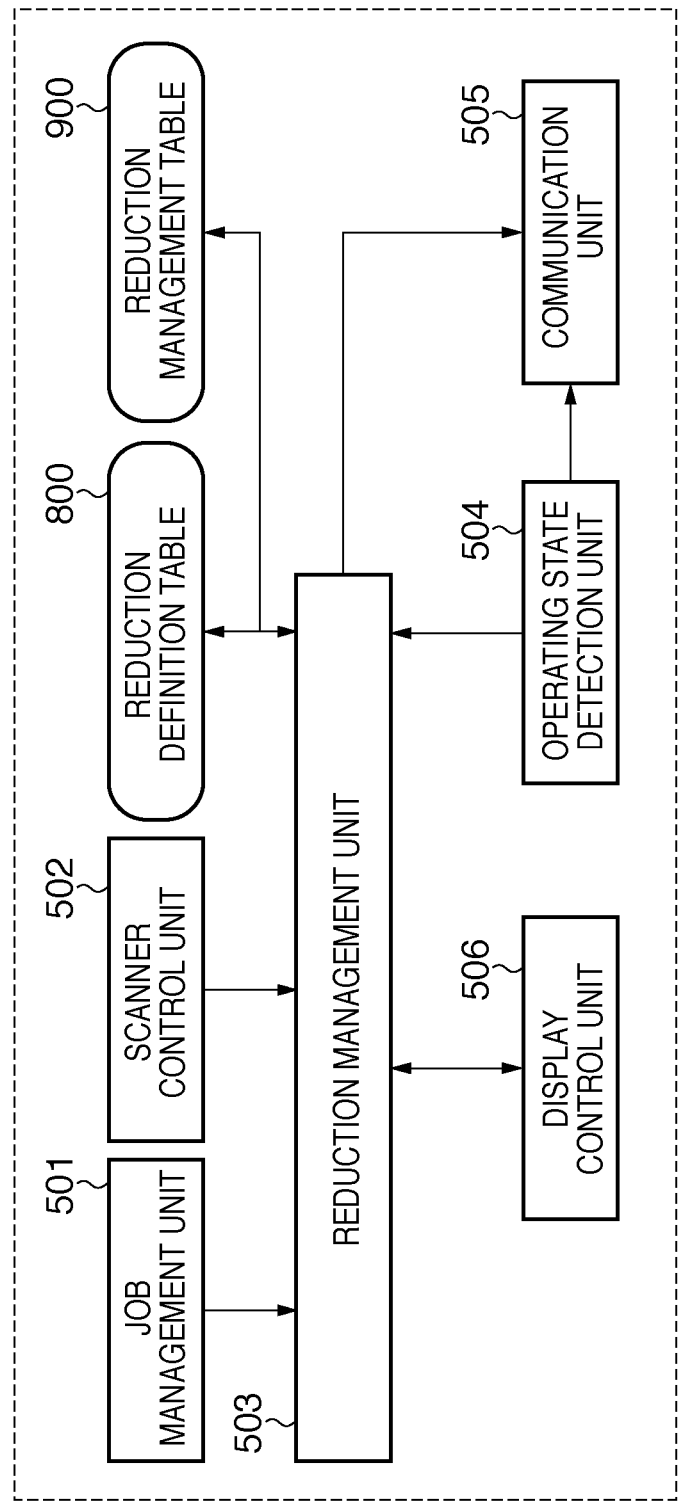
FIG. 5 is an illustration showing the configuration of the functional blocks of the controller 200 in the image forming device 100.

FIG. 5 is a schematic diagram illustrating the relationship between functional blocks in the image forming devices 100 according to the present invention. The functional blocks of this figure represent processing performed by the running of the OS, the application programs, and so on loaded in the HDD 219 by the CPU 207 of each image forming device 100 as virtual functional blocks.

The job management unit 501 performs processing in which the functions used by the user are managed as jobs. Data on results of using the manual scan function, the scan sending function, the box sending function, etc. and data on results of receiving network printing job information and fax printing job information are collected to, stored in, and managed at the job management unit 501. The job management unit 501 notifies the reduction management unit 503 of results of all jobs done at the image forming device 100 at the time of the completion of the jobs. The scanner control unit 502 controls operation at the scanner unit 217. And further, the scanner control unit 502 detects the result of detecting the placement of the documents on the ADF by the sensors of the ADF and the foregoing result of opening and closing the plank as described above. Only a certain manipulation referred to for the determination of a correspondence priority described later needs to be detected by the sensors. The scanner control unit 502 notifies the reduction management unit 503 of all results detected by the sensors in the scanner unit 217. The reduction management unit 503 manages information about which reduction state the image forming device 100 is in. And further, when having received notifications about the start and termination of a reduction operation from the operating state detection unit 504, the reduction management unit 503 registers the information about the reduction operation in a reduction management table 900 described later. Moreover, the reduction management unit 503 instructs the display control unit 506 to produce a screen display corresponding to the start or termination of the reduction operation at the operation unit 201. Furthermore, the reduction management unit 503 instructs the communication unit 505 to transmit usage trace information based on notifications from the job management unit 501 or the scanner control unit 502. At this time, the reduction management unit 503 performs the instruction as to the transmission of the usage trace information by determining which of the notifications the transmission should be based on by referring to the reduction definition table 800 and the reduction management table 900. The operating state detection unit 504 determines whether or not some operation error has occurred at the image forming device 100. In the case where an operation error has occurred, the operating state detection unit 504 determines a halt in the use of all the functions, which reduction operation is to be performed, or the termination of the reduction operation based on the nature of the error to control the operation of the whole image forming device 100. Moreover, the operating state detection unit 504 notifies the reduction management unit 503 of the start or termination of the reduction operation. Furthermore, the operating state detection unit 504 instructs the communication unit 505 to transmit the error information and the reduction information. The communication unit 505 transmits the error information, the reduction information, and the usage trace information via the network I/F 304 to the monitoring device 101 under the instructions from the reduction management unit 503 and the operating state detection unit 504.

<Error-Handling Processing by Image Forming Devices>

Figure 6A:
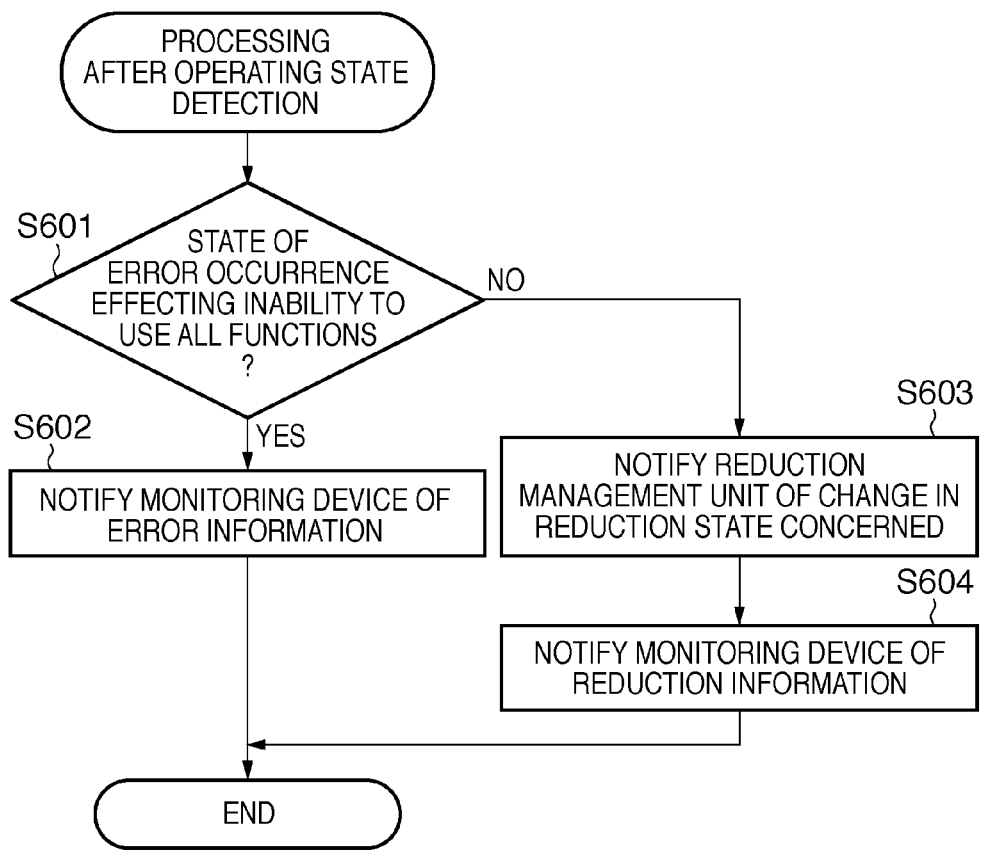
FIGS. 6A and 6B are flowcharts each illustrating processing performed by the image forming device 100 when an operating state has been detected.
Figure 6B:
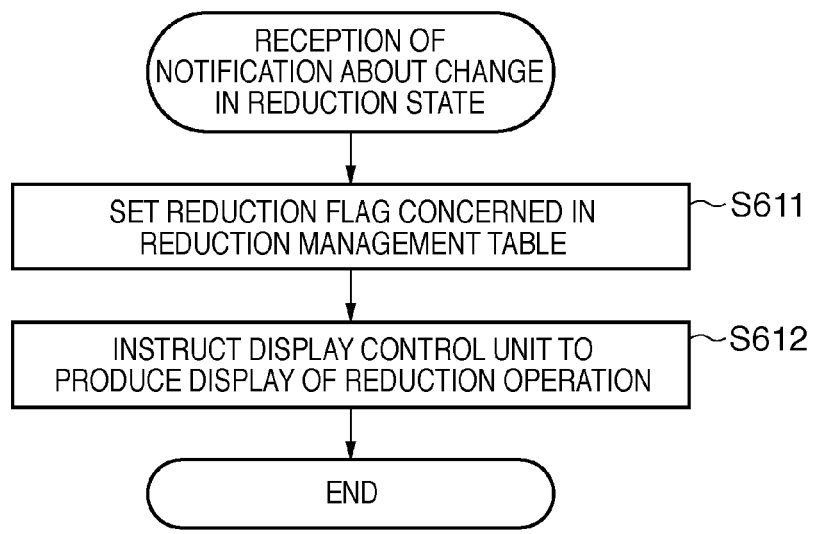

FIG. 6 is a flowchart illustrating processing performed when an operation error has occurred or has been eliminated, that is, a change in the state of an operation error has been detected at the image forming device 100. In particular, FIG. 6A illustrates processing at the operating state detection unit 504, and FIG. 6B illustrates processing at the reduction management unit 503.

<FIG. 6A>

At step S601, the operating state detection unit 504, when having detected the occurrence of an operation error at the image forming device 100, determines that the error is an error that prevents the provision of all the functions or an error that enables the reduction operation of some functions. On determining that the error is an error that prevents the provision of all the functions, the operating state detection unit 504 instructs the communication unit 505 to transmit the error information to the monitoring device 101 at the next step S602. The communication unit 505, when having taken the above instruction, transmits the error information via the network I/F 304 to the monitoring device 101.

On the other hand, on determining that the error is an error that enables the reduction operation of some functions or on determining the termination of the reduction operation, the operating state detection unit 504 notifies the reduction management unit 503 of the start or termination of the reduction operation and the reduction type at the next step S603. Processing at the reduction management unit 503 that has received such a notification will be described in the following paragraphs with reference to FIG. 6B. Finally, the operating state detection unit 504, when the reduction operation has started, instructs the communication unit 505 to transmit the reduction information at step S605. On taking the above instruction, the communication unit 505 transmits the reduction information via the network I/F 304 to the monitoring device 101, whereby this processing is finished.

<FIG. 6B>

At step S611, the reduction management unit 503 resets a reduction flag 902 in the reduction management table 900 based on the notification sent from the operating state detection unit 504 at step S603. Specifically, the reduction flag 902 corresponding to the started reduction type is set at "1", and the reduction flag 902 corresponding to the terminated reduction type is set at "0."

Figure 9:
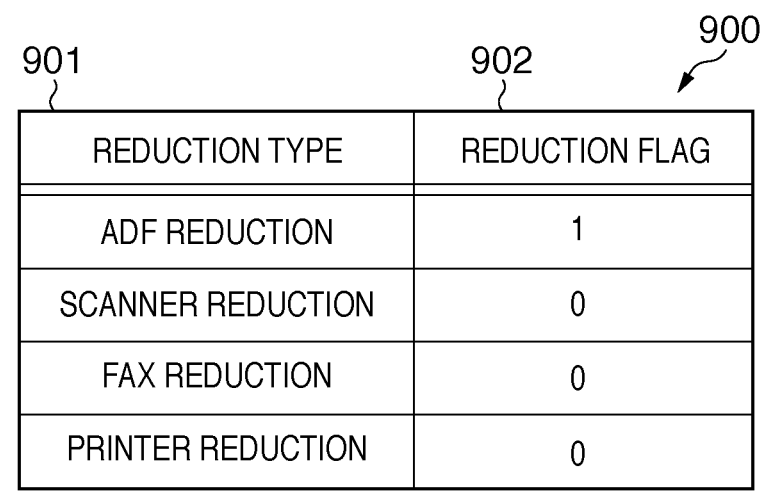

FIG. 9 is a list referred to as the reduction management table 900 data held in the HDD 219 of the image forming device 100. The reduction management unit 503 manages the reduction state of the image forming device 100 by setting the reduction flag 902 in the reduction management table 900 according to the generated reduction. Incidentally, for the reduction management tables 900, the reduction information is managed on the basis of one reduction management table 900 per image forming device 100.

Thereafter, the reduction management unit 503 instructs the display control unit 506 to produce a screen display corresponding to the start or termination of the reduction operation at the operation unit 201 at step S612, following which when a change in status of the reduction operation has occurred, the processing by the reduction management unit 503 is finished.

Note that in addition to the start of reduction operation based on error detection, even in the case where reduction operation has been intentionally started by a manipulation performed by, for example, the person in charge, the flag corresponding to the generated reduction is set in the reduction management table 900.

<Reduction Management Processing at Image Forming Devices>

Figure 7:
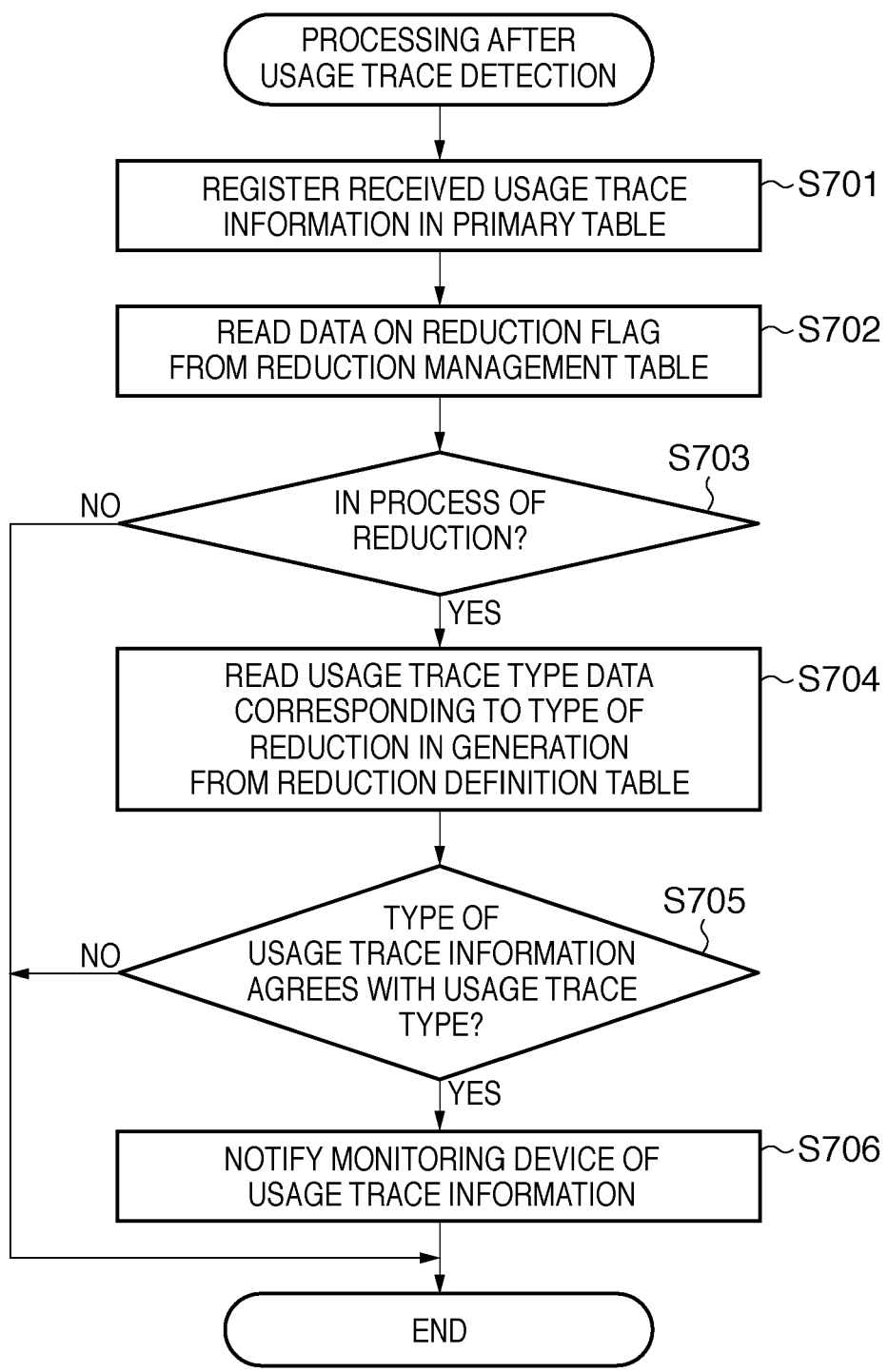
FIG. 7 is a flowchart illustrating processing performed by the image forming device 100 when usage trace information has been detected.

FIG. 7 is a flowchart illustrating processing performed when the reduction management unit 503 has received notifications from the job management unit 501 and the scanner control unit 502. Those notifications refer to a notification about a result of detection by the sensors from the scanner control unit 502 and a notification about a job.

At step S701, the reduction management unit 503 receives a notification about a result of detection by the sensors from the scanner control unit 502 or a notification about job from the job management unit 501, and registers the contents of the notification in a primary table (not shown). Then the reduction management unit 503 reads data on the state of the reduction flag from the reduction management table 900 at step S702. Thereafter, the reduction management unit 503 determines whether or not the image forming device 100 is in the process of reduction operation based on the read reduction flag state data at step S703. When it has been determined that the image forming device 100 is not in the process of reduction operation, the processing is finished as it is. On the other hand, when it has been determined that the image forming device 100 is in the process of reduction operation, the processing goes to step S704.

At step S704, the reduction management unit 503 reads from the reduction definition table 800 data on the usage trace type corresponding to the reduction type identified based on the state of the reduction flag. Then the reduction management 503 determines whether or not the contents of the notification registered in the primary table at step S701 and the usage trace type data read at step S704 agree with each other at step S705. Specifically, when the image forming device 100 is in the ADF reduction state, for example, it is determined that the contents of the notification and the usage trace type agree with each other only when the ADF document placement has been detected or the manual scan function has been used. When it has been determined that they do not agree with each other, the processing is finished as it is. On the other hand, it has been determined that they agree with each other, the reduction management unit 503 instructs the communication unit 505 to transmit usage trace information at step S706 in closing. On taking the instruction, the communication unit 505 transmits the usage trace information via the network I/F 304 to the monitoring device 101, whereby the processing is finished.

<Functional Blocks in Monitoring Device>

Figure 10:
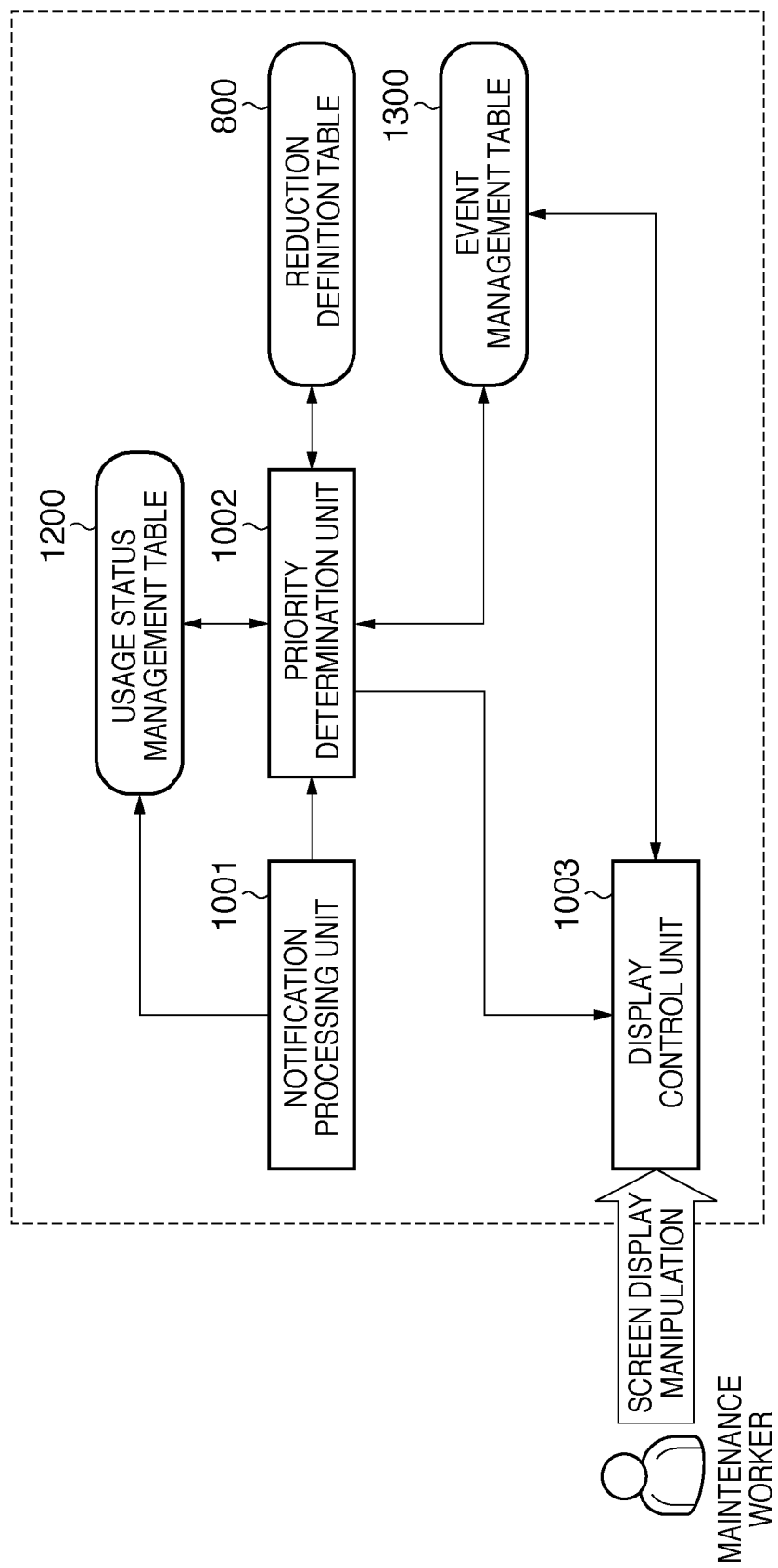
FIG. 10 is an illustration showing the configuration of functional blocks in the monitoring device 101.

FIG. 10 is a schematic diagram illustrating the relationship between functional blocks in the monitoring device 101 according to the present invention. The functional blocks of this figure represent processing performed by the running of the OS, the application programs, and so on loaded in the HDD 308 by the CPU 301 of the monitoring device 101 as virtual functional groups.

The notification-processing unit 1001 receives via the network I/F 304 usage information describing a history of manipulations by a user (usage status information and usage trace information), error information, reduction information, and so on transmitted from the image forming device 100. When having received usage status information describing the number of times the functions provided at the image forming device 100 have been performed, the notification-processing unit 1001 registers the received usage status information in a usage status management table 1200 described later. When having received error information, reduction information, and usage trace information, the notification-processing unit 1001 notifies the priority determination unit 1002 of the received information items.

The priority determination unit 1002, when having received the error information and the reduction information from the notification-processing unit 1001, registers these information items in an event management table 1300 described later. Then the priority determination unit 1002 notifies the display control unit 1003 that the event management table 1300 has been updated. When having received the usage trace information, the priority determination unit 1002 reads usage trace type data 803 and counter value data 1202 from the reduction definition table 800 and the usage status management table 1200 respectively, and determines a correspondence priority relative to the already-received reduction information. Processing on the determination will be described in detail later. Then the priority determination unit 1002 registers the determined correspondence priority in the event management table 1300, and notifies the display control unit 1003 that the event management table 1300 has been updated.

The display control unit 1003 detects a screen manipulation by the maintenance worker, and displays a fault information screen 1400 describe later on the monitor 309 of the monitoring device 101 based on the screen manipulation. And further, on receiving the notification about the updating of the event management table 1300 from the priority determination unit 1002 in the state where the fault information screen 1400 has already been displayed, the display control unit 1003 updates the display of the fault information screen 1400. At that time, the display control unit 1003 reads error information and reduction information from the event management table 1300, and performs the display of the fault information screen 1400 and the updating of the display based on those information items.

FIG. 12 is a list illustrating the usage status management table 1200 data held in the HDD 308 of the monitoring device 101. The monitoring device 101 registers usage status information from the image forming device 100 in the usage status management table 1200. In the usage status management table 1200, results of counting the number of sheets on which usage status information is described are managed on the basis of each function to be subjected to reduction. And further, the above results are also managed on the basis of the model number of each image forming device 100.

FIG. 13 is a list illustrating the event management table 1300 data held in the HDD 308 of the monitoring device 101. The monitoring device 101 registers error information and reduction information from the image forming device 100 in the event management table 1300. Specifically, the model numbers of the image forming devices 100 are registered in a model number field 1301, and the date and time of each error and those of each reduction are registered in an occurrence date and time field 1302. In an event type field 1303, identifying information, that is, error information and reduction type information are registered. In an event content field 1304, the nature of each error and the type of each reduction are registered. In a correspondence priority field 1305 are registered correspondence priorities relative to reduction information items determined at the priority determination unit 1002 of the monitoring device 101.

<Processing for Determination of Correspondence Priorities Relative to Image Forming Devices by Monitoring Device>

Figure 11B:
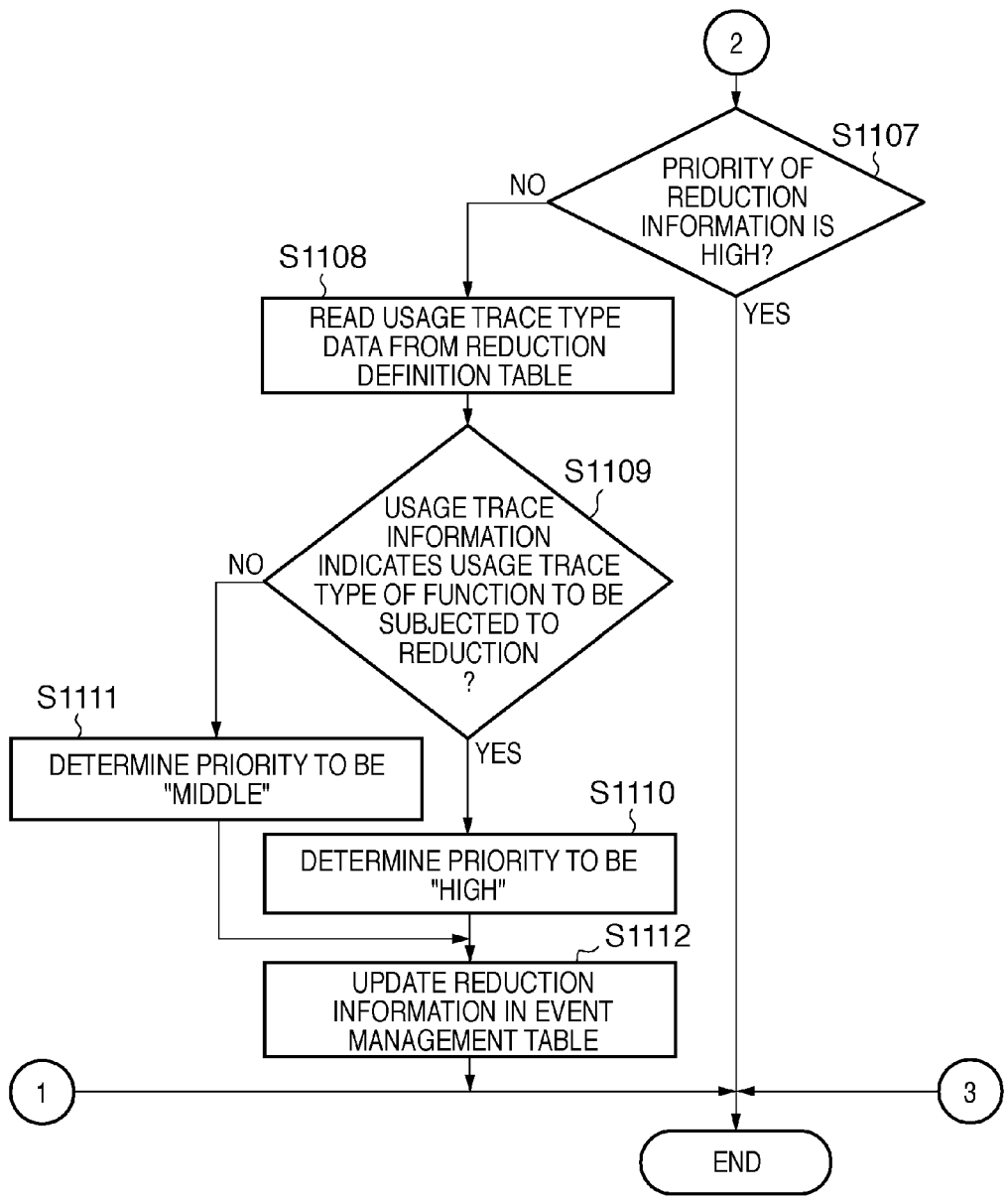

FIGS. 11A and 11B are flowcharts illustrating processing performed when the notification-processing unit 1001 of the monitoring device 101 has received error information, reduction information, and usage trace information from the image forming device 100.

At step S1100, the notification-processing unit 1001 determines whether received information (notification) is usage status information or not. When the received information is usage status information, the notification-processing unit 1001 registers the information in the usage status management table 1200 at step S1103, whereby the processing is finished. On the other hand, when the received information is not usage status information, the notification-processing unit 1001 notifies the priority determination unit 1002 of the received information at step S1101.

After the reception of the notification from the notification-processing unit 1001, the priority determination unit 1002 determines whether the received information is error information or not at step S1102. When the received information is error information, the priority determination unit 1002 registers the information in the event management table 1300 at step S1104, whereby the processing is finished. On the other hand, when the received information is not error information, the priority determination unit 1002 further determines whether the received information is reduction information or not at step S1113. When the received information is reduction information, the priority determination unit 1002 determines the correspondence priority of the received reduction information, that is, assigns the information a predetermined priority—a "low" priority in this example—at step S1114. Then the received reduction information is registered in the event management table 1300 at step S1104; at the time of the registration of the reduction information, the priority determined at step S1114 is registered therein as a correspondence priority 1305.

In the case where the received information is not reduction information at step S1113, the priority determination unit 1002 determines whether the received information is usage trace information or not at step S1105. When the received information is not usage trace information, the processing is finished at the priority determination unit 1002. On the other hand, when the received information is usage trace information, the priority determination unit 1002 reads from the event management table 1300 the most up-to-date reduction information corresponding to the model number of the image forming device 100 included in the usage trace information at step S1106. Then the priority determination unit 1002 determines whether the correspondence priority of the read reduction information is "high" or not at step S1107. When the correspondence priority of the read reduction information is "high" (that is, when the reduction information is assigned a high priority), the processing is finished at the priority determination unit 1002; when the correspondence priority of the reduction information is not "high", the processing goes to step S1108.

At step S1108, the priority determination unit 1002 reads from the reduction definition table 800 usage trace type information corresponding to a reduction type included in the reduction information read at step S1106. Then the priority determination unit 1002 determines at step S1109 whether or not the received usage trace information agrees with the usage trace type information concerning reduction function read at step S1108. Specifically, when the reduction type included in the reduction information read at step S1106 is, for example, ADF reduction, information about two event types, or ADF document placement information and manual scan information, is read therefrom as usage trace types at step S1108. In the case where the received usage trace information is ADF document placement information, it is determined as step S1109 that the received usage trace information agrees with the read usage trace type information.

When it has been determined at step S1109 that the received usage trace information agrees with the read usage trace type information, the priority determination unit 1002 determines at step S1110 that the correspondence priority of the reduction information read at step S1106 is "high." On the other hand, when it has been determined at step S1109 that they do not agree, that is, when the received usage trace information agrees with usage trace type information concerning some alternative function, it is determined at step S1111 that the correspondence priority of the reduction information read at step S1106 is of "middle" level (a middle priority). Thereafter, at step S1112, the priority determination unit 1002 changes the correspondence priorities 1305 of reduction information items in the event management table 1300 corresponding to the reduction information read at step S1106 to the correspondence priority determined at step S1110 or S1111, whereby the processing is finished.

The processing by the priority determination unit 1002 at steps S1105 to S1112 makes it possible to assign received reduction information the correspondence priority of which has been determined to be "low" a higher correspondence priority based on the contents of usage trace information received after the reception of the reduction information.

<Supplementary Effect Produced in First Embodiment>

In principle, when operational faults or the like have occurred at plural image forming devices at the same time, priority is given to maintenance work on the image forming devices at which the provisions of all functions are halted, but maintenance work on the image forming devices in reduction operation are assigned a low priority. This is because the image forming devices in reduction operation can be considered as image forming devices that normally operate except that part of their functions is not performed. However, it can also be considered that there is the case where the user desires their immediate recovery such as the case where the user insists on using a function(s) the provision of which is halted during reduction operation. For example, there is the case where when only one image forming device with a fax function is provided in the user's system environment, fax reduction is generated. Moreover, in a user environment where large quantities of documents are frequently copied, work efficiency falls considerably due to ADF reduction. Considering these cases, it is desirable that even image forming devices in reduction operation be promptly subjected to maintenance work by heightening their maintenance priority.

In this embodiment, the priority of the maintenance of image forming devices in the state of reduction is determined based on trace information indicating what function has been used at the image forming devices or what function has been used for an attempt. Specifically, when some function the provision of which is halted due to reduction is used for an attempt or when some function that can be an alternative to such a function is used, their priority is set at a relatively high level. Therefore, by determining a need for some function the use of which is limited due to reduction based on the [trace]of having used the function, a maintenance priority corresponding to the need can be presented to the maintenance worker who maintains image forming devices in reduction operation.

FIG. 14 is an illustration showing an example of a display of a fault information screen 1400 produced at the display control unit 306 under the control of the display control unit 1003 of the monitoring device 101.

The display control unit 1003, when having detected an instruction as to a display of a fault information screen 1400 from the maintenance worker, makes the display control unit 306 display the fault information screen 1400 on the monitor 309 based on the error information and the reduction information registered in the event management table 1300. And further, as described above, when a notification as to the updating of the event management table 1300 has been received from the priority determination unit 1002 in the state where the fault information screen 1400 has already been displayed, the contents of the display on the fault information screen 1400 are updated. The contents of the display on the fault information screen 1400 are equal to the contents of the event management table 1300. That is, the correspondence priorities are presented in relation to corresponding reduction information items. In FIG. 14, however, the correspondence priorities are different from reduction information items in the event management table in order. And further, the layout of the display contents on the fault information screen 1400 is the same as that of the information items in FIG. 14; on this screen, since the correspondence priorities 1405 of reduction information items are presented in particular, the maintenance worker can detect the occurrence of some fault to be recovered and reduction operation at the same time, and can easily determine the correspondence priority of reduction information. Incidentally, the notification about such fault information can also be made by the use of a dedicated device by the maintenance worker, by sending an e-mail to the device maker who arranges for the maintenance worker to maintain the devices, or the like in addition to the display on the monitor.

Second Embodiment

A second embodiment in which the present invention is implemented will be described below with reference to the drawings. In this embodiment, the determination of the priorities at the monitoring device is made not only based on the processing performed in the first embodiment but also by referring to usage status information transmitted from the image forming devices.

Figure 15A:
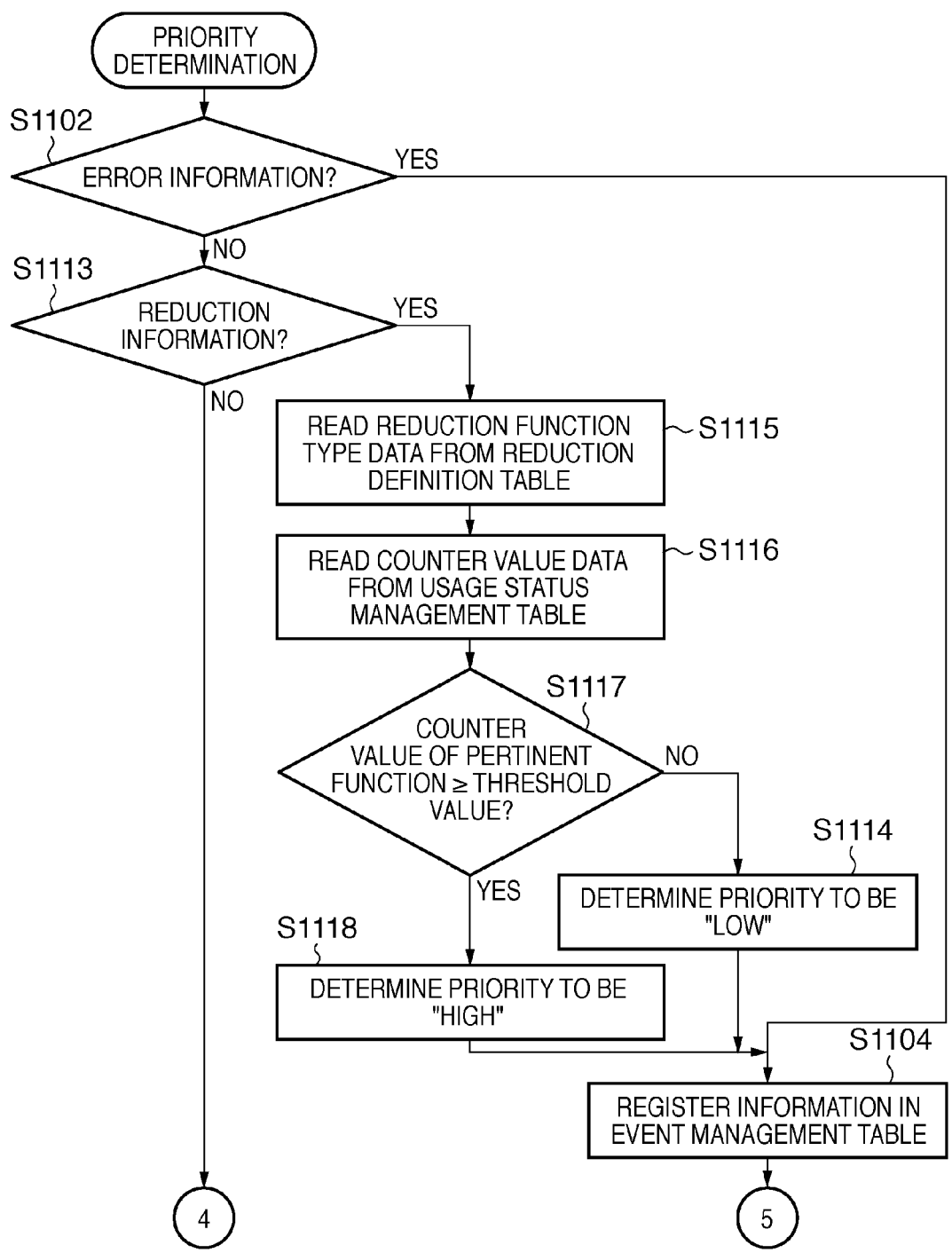
FIGS. 15A and 15B show flowcharts illustrating processing performed when the monitoring device 101 has received usage status information, error information, reduction information, and usage trace information from the image forming device 100.
Figure 15B:
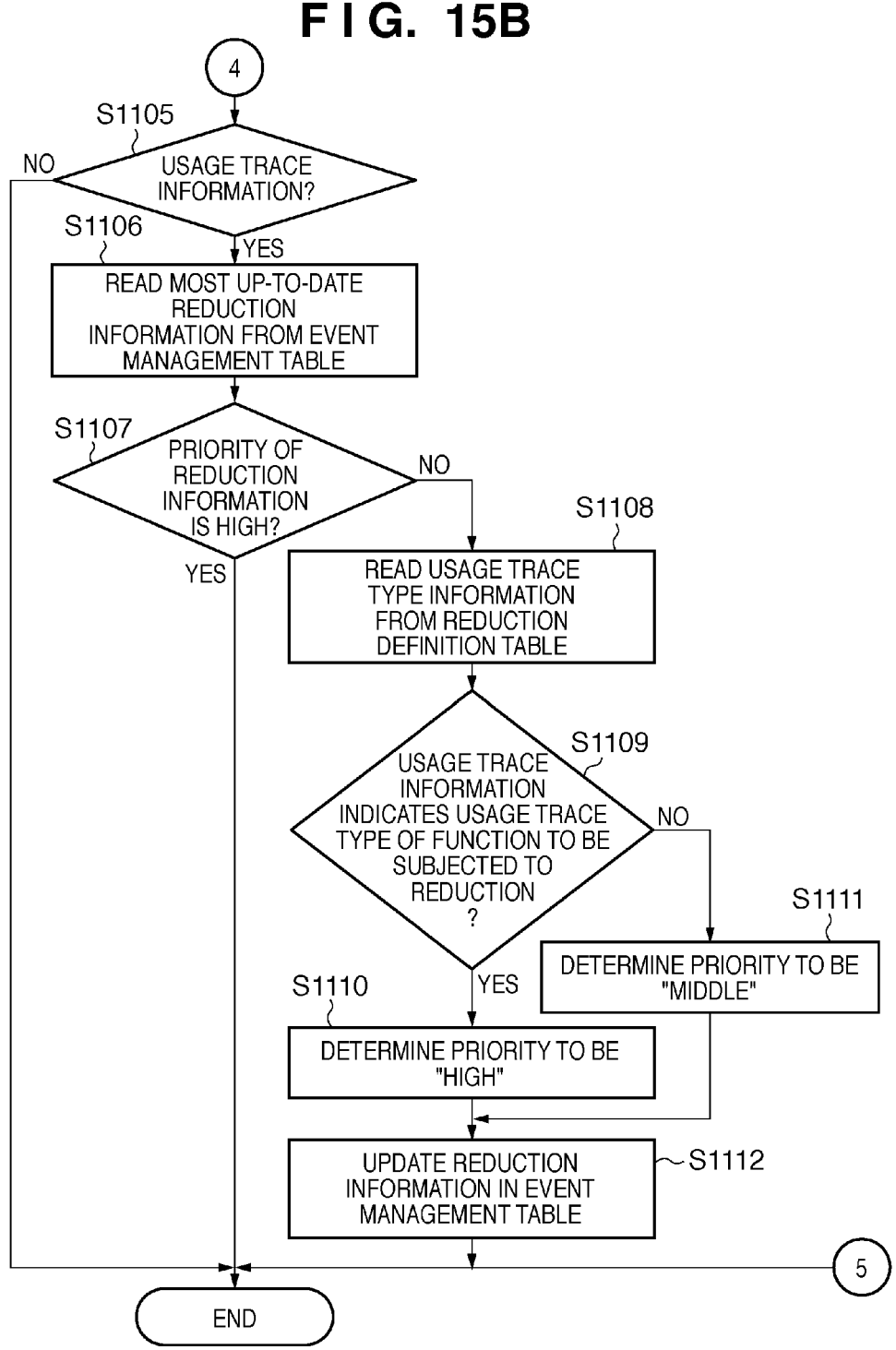

FIGS. 15A and 15B are flowcharts illustrating processing performed after the notification-processing unit 1001 of the monitoring device 101 has received usage status information, error information, reduction information, and usage trace information from the image forming devices 100. FIGS. 15A and 15B illustrate the flow of processing performed by the priority determination unit 1002 in the processing flowchart of FIGS. 11A and 11B referred to in the first embodiment. Processing performed by the notification-processing unit 1001 at steps S1100, S1101, and S1103 is the same as that performed in the first embodiment. In FIGS. 15A and 15B, processing at step S1115 to S1118 is added to the processing shown in FIGS. 11A and 11B. In the following, the above additional processing will be described with reference to FIGS. 15A and 15B.

The priority determination unit 1002, when having made the determination at step S1113 that information transmitted from the notification-processing unit 1001 is reduction information, reads from the reduction definition table 800 reduction function type information corresponding to reduction type information included in the received reduction information at step S1115. Specifically, when reduction type information included in the reduction information is, for example, ADF reduction, ADF scan function information is read therefrom as a reduction function type.

Then, at step S1116, the priority determination unit 1002 reads from the usage status management table 1200 (see FIG. 12) a counter value as usage status information corresponding to the reduction type data read at step S1115. Specifically, when the reduction type information included in the reduction information is, for example, ADF reduction information, a value of "20305" is read therefrom as a counter value. Thereafter, the priority determination unit 1002 determines the difference between the counter value read at step S1116 and a predetermined threshold at step S1117. When the counter value is equal to or larger than the threshold value, the correspondence priority of the reduction information received at step S1118 is determined to be "high." When the counter value is smaller than the threshold value, the correspondence priority of the reduction information received at step S1114 is determined to be "low." Finally the priority determination unit 1002 registers the received reduction information and the results of the determinations made at steps S1114 and S1118 in the event management table 1300, whereby the processing is finished.

The execution of the above processing at the priority determination unit 1002 makes it possible to determine the correspondence priority of received reduction information based on the time when functions to be subjected to reduction have been used. And further, the execution of the processing steps S1105 to S1112 described in the first embodiment at the priority determination unit 1002 makes it possible to assign received reduction information the correspondence priority of which has been determined to be "low" a higher correspondence priority based on the contents of usage trace information received after the reception of the reduction information.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-027000, filed Feb. 9, 2010, which is hereby incorporated by reference herein in its entirety.

What is claimed is:

1. A monitoring device for monitoring an image forming device by being connected with the image forming device capable of operating in a reduction mode in which provision of a function is halted, the monitoring device comprising:
   a receiver configured to receive from the image forming device usage information indicating a history of manipulations by a user and reduction information indicating that the image forming device is operating in a reduction mode;
   a priority determination unit configured to, when having received the reduction information with the receiver, determine a priority of maintenance work on a function the provision of which has been halted indicated by the reduction information;
   a registration unit configured to register in a management table the reduction information received by the receiver and the priority determined by the priority determination unit based on the reduction information in association with each other; and
   an output unit configured to output the reduction information and the associated priority information registered in the management table by the registration unit,
   wherein when the usage information received by the receiver indicates a manipulation with respect to a function the provision of which has been halted indicated by the received reduction information, the priority determination unit determines a priority corresponding to the reduction information so that the priority is relatively higher than in the case where there is no manipulation with respect to the function the provision of which has been halted indicated by the received reduction information.

2. The monitoring device according to claim 1, wherein the usage information includes usage trace information including at least one of:
   information about a manipulation with respect to a function the provision of which has been halted when the image forming device is operating in the reduction mode; and
   information about a manipulation with respect to of an alternative function to the function the provision of which has been halted.

3. The monitoring device according to claim 2,
   wherein the usage information includes usage status information periodically received by the receiver and indicating the number of times each function provided by the image forming device is performed.

4. The monitoring device according to claim 3,
   wherein when the number of times a manipulation with respect to a function the provision of which has been halted indicated by the received reduction information is performed exceeds a threshold value, according to the usage state information received by the receiver, the priority determination unit determines a priority corresponding to the reduction information so that the priority is relatively higher than in the case where the number of times a manipulation with respect to the function the provision of which has been halted indicated by the received reduction information is performed is below the threshold value.

5. The monitoring device according to claim 1,
   wherein the receiver further receives information about fault that is subjected to maintenance work from the image forming device, and
   the output unit outputs, in addition to the reduction information, the received fault information.

6. The monitoring device according to claim 1,
wherein in the image forming device, provision of at least one of an automatic document feeding function, scanner function, facsimile function, and printer function can be halted in the reduction mode, and
wherein the priority determination unit determinates that the usage information indicates a manipulation with respect to a function the provision of which has been halted indicated by the received reduction information,
when the usage information indicates placement of a document onto an automatic document feeding mechanism of the image forming device, if the function the provision of which has been halted in the reduction mode is the automatic document feeding function,
when the usage information indicates placement of a document onto an automatic document feeding mechanism of the image forming device or opening and closing of a document pressing plate, if the function the provision of which has been halted in the reduction mode is the scanner function, and
when the usage information indicates reception of a job by the image forming device, if the function the provision of which has been halted in the reduction mode is the printer function.

7. An image forming device connected with the monitoring device according to claim 1 and capable of operating in a reduction mode in which provision of a function is halted, the image forming device comprising:
a unit configured to, when the image forming device operates in the reduction mode, transmit to the monitoring device reduction information indicating the operation in the reduction mode;
a detector configured to detect a manipulation by a user; and
a unit configured to transmit information about the manipulation detected by the detector to the monitoring device as usage information.

8. A system, wherein a plurality of image forming devices capable of halting provision of a function in a reduction mode are connected with a monitoring device that monitors the image forming devices, the system comprising:
a priority determination unit configured to, by using usage information indicating a history of manipulations by a user at an image forming device and reduction information indicating that the image forming device is operating in a reduction mode, determine a priority of maintenance work on a function the provision of which has been halted indicated by the reduction information;
a registration unit configured to register in a management table the reduction information and the priority determined by the priority determination unit based on the reduction information in association with each other; and
an output unit configured to output the reduction information and the associated priority information registered in the management table by the registration unit,
wherein when the usage information indicates a manipulation with respect to a function the provision of which has been halted indicated by the reduction information, the priority determination unit determines a priority corresponding to the reduction information so that the priority is relatively higher than in the case where there is no manipulation with respect to the function the provision of which has been halted indicated by the reduction information.

9. A method for monitoring an image forming device executed by a monitoring device connected with the image forming device capable of operating in a reduction mode in which provision of a function is halted, the method comprising:
a reception step of receiving from the image forming device usage information indicating a history of manipulations by a user and reduction information indicating that the image forming device is operating in a reduction mode;
a priority determination step of, when having received the reduction information at the reception step, determining a priority of maintenance work on a function the provision of which has been halted indicated by the reduction information;
a registration step of registering in a management table the reduction information received at the reception step and the priority determined based on the reduction information at the priority determination step in association with each other; and
an output step of outputting the reduction information and the associated priority information registered in the management table,
wherein at the priority determination step, when the usage information received in the reception step indicates a manipulation with respect to a function the provision of which has been halted indicated by the received reduction information, the priority corresponding to the reduction information is determined to be relatively higher than in the case where there is no manipulation with respect to the function the provision of which has been halted indicated by the received reduction information.

10. A method for monitoring a plurality of image forming devices executed by a computer included in a system in which the image forming devices capable of halting provision of a function in a reduction mode and a monitoring device for monitoring the image forming devices are connected with each other, the method comprising:
a priority determination step of, by using usage information indicating a history of manipulations by a user at the image forming device and reduction information indicating that the image forming device is operating in a reduction mode, determining a priority of maintenance work on a function the provision of which has been halted indicated by the reduction information;
a registration step of registering in a management table the reduction information and the priority determined based on the reduction information at the priority determination step in association with each other; and
an output step of outputting the reduction information and the associated priority information registered in the management table,
wherein at the priority determination step, when the usage information indicates a manipulation with respect to a function the provision of which has been halted indicated by the reduction information, the priority corresponding to the reduction information is determined to be relatively higher than in the case where there is no manipulation with respect to the function the provision of which has been halted indicated by the reduction information.

11. A non-transitory computer-readable storage medium that can be connected with an image forming device capable of operating in a reduction mode in which provision of a function is halted and that stores a program for making a computer execute a method for monitoring the image forming device, the monitoring method comprising:

a reception step of receiving from the image forming device usage information indicating a history of manipulations by a user and reduction information indicating that the image forming device is operating in a reduction mode;

a priority determination step of, when having received the reduction information at the reception step, determining a priority of maintenance work on a function the provision of which has been halted indicated by the reduction information is determined;

a registration step of registering in a management table the reduction information received at the reception step and the priority determined based on the reduction information at the priority determination step in association with each other; and an output step of outputting the reduction information and the associated priority information registered in the management table, wherein at the priority determination step, when the usage information received at the reception step indicates a manipulation with respect to a function the provision of which has been halted indicated by the received reduction information, the priority corresponding to the reduction information is determined to be relatively higher than in the case where there is no manipulation with respect to the function the provision of which has been halted indicated by the received reduction information.

12. A monitoring device for monitoring an image forming device by being connected with the image forming device capable of operating in a reduction mode in which provision of a function is halted, the monitoring device comprising:

a receiving means for receiving from the image forming device usage information indicating a history of manipulations by a user and reduction information indicating that the image forming device is operating in a reduction mode:

a priority determination means for determining, when having received the reduction information with the receiver, a priority of maintenance work on a function the provision of which has been halted indicated by the reduction information;

a registration means for registering in a management table the reduction information received by the receiver and the priority determined by the priority determination means based on the reduction information in association with each other; and an output means for outputting the reduction information and the associated priority information registered in the management table by the registration means, wherein when the usage information received by the receiving means indicates a manipulation with respect to a function the provision of which has been halted indicated by the received reduction information, the priority determination means determines a priority corresponding to the reduction information so that the priority is relatively higher than in the case where there is no manipulation with respect to the function the provision of which has been halted indicated by the received reduction information.

* * * * *